United States Patent [19]

Fujimoto et al.

[11] Patent Number: 4,979,431
[45] Date of Patent: Dec. 25, 1990

[54] GASEOUS FLOW CONSTRUCTION OF BOX MEMBER FOR REFRIGERATED TRANSPORTION AND BOX MEMBER FOR REFRIGERATED TRANSPORTATION USING THE SAME

[75] Inventors: Shizuo Fujimoto, Tokushima; Yoshinori Akagawa, Nagoya; Takayuki Usui, Kanazawa, all of Japan

[73] Assignees: Mitsui O. S. K. Lines, Ltd.; Daikin Industries, Ltd.; Nippon Trailmobile Co., Ltd., all of Ohsaka, Japan

[21] Appl. No.: 430,121

[22] Filed: Nov. 1, 1989

[30] Foreign Application Priority Data

Nov. 8, 1988 [JP] Japan ................................ 63-282057
Nov. 8, 1988 [JP] Japan ................................ 63-282058

[51] Int. Cl.⁵ .............................................. B60P 3/20
[52] U.S. Cl. ............................................ 98/6; 62/239; 62/408
[58] Field of Search ................ 62/239, 408, 407; 98/6

[56] References Cited

U.S. PATENT DOCUMENTS

| | | | |
|---|---|---|---|
| 2,881,600 | 4/1959 | Elfving | 62/239 |
| 3,792,595 | 2/1974 | Willis | 62/239 |
| 4,467,612 | 8/1984 | Weasel, Jr. | 62/239 |
| 4,553,403 | 11/1985 | Taylor | 62/239 |
| 4,726,196 | 2/1988 | Zajic | 62/239 |
| 4,800,733 | 1/1989 | Strobel et al. | 62/239 |

Primary Examiner—Lloyd L. King
Attorney, Agent, or Firm—Rodman & Rodman

[57] ABSTRACT

A box member for refrigerate transportation for containing perishables therein and transporting thereby. A gas fed from a refrigerating unit flows from above to below through a gas flow path and gas flow holes of an insulating plate in the vicinity of a ceiling of the box member. A damper device for closing the gas flow path during defrosting is provided in the vicinity of an inlet of the gas flow path. An air shut-off curtain which is suspended from the ceiling and a protecting mechanism thereof are provided at the rear portion of the box member. A water tank is provided at the inside of a front corner post, and a level gauge for visually confirming the water level of the water tank and a water feed port to the water tank are provided at the outside of the front corner post. The level gauge is provided with a discharge valve and a protective net.

9 Claims, 8 Drawing Sheets

GASEOUS FLOW CONSTRUCTION OF BOX MEMBER FOR REFRIGERATED TRANSPORTION AND BOX MEMBER FOR REFRIGERATED TRANSPORTATION USING THE SAME

BACKGROUND OF THE INVENTION

1. Field of the Invention

This invention relates to a gaseous flow construction of a large-sized box member for refrigerated transportation and a box member using the same, by which large quantities of perishables such as vegetables, fruits, fishes and meats are transported without decreasing freshness thereof.

2. Prior Art

When, for example, vegetable perishables such as vegetables, fruits and flowers or animal perishables such as fishes and meats are transported, it is most important not to decrease freshness of the perishables during transportation and storage.

Moreover, a condition for preserving freshness of the perishables is considerably different depending on the types of the perishables transported.

Accordingly, in order to preserve freshness of perishables, it is necessary to keep them under an optimum low temperature condition in accordance with the type of the perishables.

For instance, perishables such as vegetables, fruits and flowers would require a range of low temperature within which deterioration troubles due to a low temperature would not be invited.

In the case of the perishables such as fishes and meats, if changes in taste and preservability would occur due to freezing, at least a range of non-freezing low temperature condition would be required for preserving them. On the other hand, in the case of the fishes and meats which would not invite a problem of taste change even when they would be frozen, a low temperature condition different from the above would be selected correspondingly.

In the case of a large-sized box member for refrigerated transportation, for example one for transporting a large quantity of perishables keeping freshness to a remote destination such as an overseas destination, the total length is determined by the international standards, and in general a length of 20 feet (about 6 m) or 40 feet (about 12 m) is widely used.

It is a common practice that an evaporator, a blast fan, a humidifying means and the like for a refrigeration unit are provided at the forward end portion of the inner side of the box member. In this case, even in the overseas container of 20 feet, the rear end portion of the inside thereof is at least spaced apart 5 m or more from the refrigerating unit. Furthermore, cool air in the box member would not be uniformly distributed depending on the loading condition of goods. Thus, the condition of the air should naturally be different from a position close to the refrigeration unit to a position remote therefrom. Further, in the overseas container of 40 feet, the rear end thereof would be spaced 10 m or more from the refrigerating unit and moreover an opening door would be mounted to the rear end thereof, whereby, when the door is opened, hot air would rapidly flow from the outside, so that it would not easy to keep the air condition uniformly at every position in the box member.

The above described situation would not only be limited to the overseas container and it would true of a large sized land container for land transportation by a large sized truck.

As described above, in order to keep freshness of the perishables, it is necessary to preserve the perishables at the optimum low temperature condition depending on the types thereof, so that, in the past, in order to transport the perishables, there has been proposed a humidity control device of a refrigerating unit as disclosed in Japanese Utility Model Unexamined Publication No. 63-63671 for example.

This conventional humidity control device of the refrigerating container is constructed such that, in addition to a refrigerating unit for feeding the air cooled by a refrigerator, a humidifying means is provided. This humidifying means is controlled in accordance with a signal from a humidity detecting means which detects humidity of air in a box member. Main and auxiliary flow paths of cooled air are laid on a floor of the box member, and it is said that cooled air adjusted in temperature and humidity is distributed from clearances of the flow paths or holes opened upwardly in these flow paths to the every corners through gaps between the perishables loaded in the box member, so that the box member can be uniformly cooled.

With the above-described conventional construction, in order to keep a uniform temperature and also humidity in the box, the cooled air is fed from below to above through the clearance or the open hole of the flow paths.

However, as the goods would be piled up on the main air flow path and the auxiliary air flow path, when the undersurfaces of the goods is close to flat surfaces without irregularities, the clearances or open holes of the flow paths would be substantially completely blocked, thus presenting a problem that the air would not flow upwards and not distributed to the corners of the goods.

Furthermore, in general, a heating device would be provided in a refrigerating unit, and the heating device would be periodically operated to defrost inside the refrigerating unit while a blast fan is stopped. However in that case, in the refrigerating unit having a humidity control means, frosting would be accelerated in particular, and, even if the blast fan is stopped during defrosting, heated hot air would flow into the box member due to natural convection, thus presenting a problem that the temperature in the box member would not be uniform.

Further, in the case of the conventional refrigerating unit, when the door at the rear end would be opened due to loading or unloading of the goods to and from the box member, hot air would rapidly flow into from the outside, thus presenting a problem that the air condition in the box member would not be kept constantly.

Furthermore, in the conventional construction, as the humidifying means is controlled in response to the signal from the humidity detecting means, the construction of the humidifying means is highly complicated. And the water level of a water tank supplying the water to the humidifying means would not be easily confirmed from the outside, thus presenting a problem that water supply would not be easy.

SUMMARY OF THE INVENTION

One object of the present invention is to provide a gaseous flow construction of a box member for refrigerated transportation capable of keeping uniform gas temperature at every position in the box member for refrigerated transportation.

Another object of the present invention is to provide a technique of distributing a gas flow to every corner of the goods in the box member.

A further object of the present invention is to provide a gaseous flow construction of a box member for refrigerated transportation, capable of preventing a heated gas from flowing into the box member during defrosting.

A still further object of the present invention is to provide a box member for refrigerated transportation, capable of preventing an atmospheric air from invading into the box member during loading or unloading of the goods from the rear portion of the box member.

A yet further object of the present invention is to provide a box member for refrigerated transportation, capable of preventing an impact force from being directly applied to an air shut-off means provided in the rear portion of the box member.

A still more further object of the present invention is to provide a water tank mount construction of the box member, capable of easily confirming the water level of a water tank provided in the box member for refrigerated transportation and easily supplying water from the outside.

A still further object of the present invention is to provide a water tank mount construction of a box member for refrigerated transportation, capable of stably and reliably mounting a water tank in the box member for refrigerated transportation.

A still more further object to the present invention is to provide a water tank mount construction of a box member for refrigerated transportation, capable of reliably preventing a level gauge from freezing and/or reliably protecting the level gauge from an external impact.

The above-described and other objects, and novel characteristics of the present invention will be apparent from description below and the accompanying drawings.

Out of the inventions disclosed, typical outlines thereof will be hereunder be described in brief.

The gaseous flow construction of the box member for refrigerated transportation according to the present invention is constructed such that the refrigerating unit having a gas feed port in the forward portion in the box member and a gas intake port at the bottom thereof is provided, and a plate member, such as an insulating plate, formed therein with a plurality of gas flow holes is stretched being spaced apart a ceiling of the box member, thus forming a gas flow section.

In the gaseous flow construction of this box member for refrigerated transportation, may be provided a damper device in the vicinity of the afore said gas feed port, for preventing heated gas from flowing into the gas flow section and a storage chamber of the box member.

The damper device may have a plurality of vanes rotatably supported and adjacent to one another in the width wise direction of the gas flow section, and the plurality of vanes rotate upwardly to open the gas flow section during operation of the blast fan provided at the forward portion of the interior of the box member, and rotate downwardly to block the gas flow section during the stop of the blast fan.

Further, in addition to the above-described gas flow construction, the box member may be provided with an air shut-off means suspended from the rear portion of the ceiling and at a position spaced a predetermined space from the inner side surface of the opening door provided at the rear portion of the box member.

In the vicinity of the top portion of the air shut off means, there may be provided a protecting means projected outwardly from the top portion of the air shut-off means, for preventing an impact force from being directly applied to the air shut-off means.

The water tank mount construction according to the present invention is arranged such that the water tank is provided inside the box member, and the level gauge for confirming the water level of the water tank and the water feed port to the water tank are provided at the outside of the box member for refrigerated transportation.

In this water tank mount construction of the box member of refrigerated transportation, the water tank may be provided at the inside of a front corner post, and the level gauge and the water feed port may be provided at the outside of the front corner post.

Furthermore, a tank mount member suitably bent into a shape to the water tank may be provided at the inside of the front corner post.

Further, at the bottom of the level gauge, a discharge valve for discharging water from the level gauge may be provided.

Furthermore, a protecting means for protecting the level gauge from the external impact may be provided at the outside of the level gauge.

In the air flow construction of the box member according to the present invention, the cooled air flows from above to below, i.e. from the gas flow section provided at the undersurface of the ceiling into the box member through the gas flow holes formed in the plate member. On the other hand, in general, the goods are not loaded to the height in close contact with the plate member at the ceiling of the box, whereby the cooled air smoothly flows in, i.e. flows down into the box, with the gas flow holes of the plate member not being blocked by the goods.

Furthermore, in the gas flow construction according to the present invention, the insulating plate as being the plate member having the gas flow holes is used, whereby the humidified air is not condensed and no drops fall.

The damper device is provided for preventing the heated gas from flowing into the gas flow section during defrosting, so that the heated gas can be reliably prevented from passing into the box member due to natural convection.

Further, the air shut-off means is suspended from the rear portion of the ceiling, whereby no rapid hot wind flows in from the outside during opening the door, so that the condition in the box member can be kept constant.

Furthermore, in the vicinity of the top portion of the air shut-off means, the protecting means for protecting the air shut off means from external direct impact is provided, so that the air shut-off means can be prevented from being broken by the impact force from the external means used for loading or unloading the goods into or from the box.

In the water tank mount construction of the box member according to the present invention, confirmation of the water level in the water tank provided in the box member and water supply can be easily performed by the level gauge and the water feed port which are provided at the outside of the box member.

Furthermore, in the water tank mount construction according to the present invention, the water tank is provided at the inside of the front corner post, and the level gauge and the water discharge port are provided at the outside of the front corner post, so that confirmation of the water level in the water tank and water supply can be very reliably and easily performed without being hindered by any other structures.

The tank mount member suitably bent to the shape of the water tank at the inside of the front corner post makes it possible to very stably and reliably mount the water tank.

Further, the provision of the water discharge valve at the bottom portion of the level gauge makes it possible to discharge the water in the water tank and to prevent break of the level gauge due to freezing even when used in a very cold weather for example.

Furthermore, the provision of the protecting means at the outside of the level gauge makes it possible to prevent the level gauge from being broken by any external impact force during operation.

BRIEF DESCRIPTION OF THE DRAWINGS

The above and other objects and features of the present invention will become more apparent when referred to the following description given in conjunction with the accompanying drawings, wherein like reference numerals denote like elements, and in which.

DETAILED DESCRIPTION OF THE PREFERRED EMBODIMENT

Figure 1:
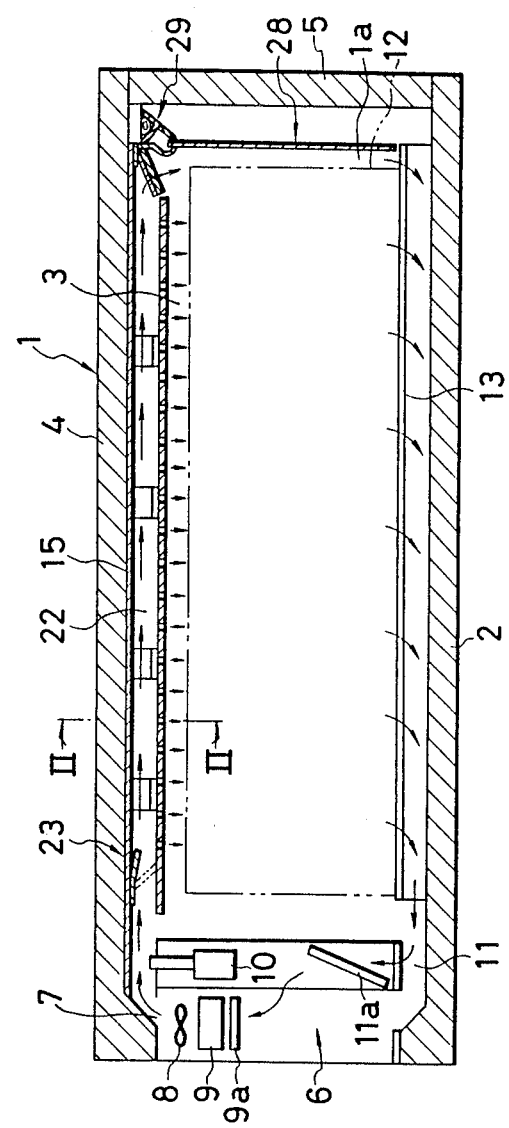
FIG. 1 is a longitudinal sectional view showing a box member for refrigerated transportation embodying the present invention.

Referring to the drawings, a box member 1 of refrigerated transportation of this embodiment comprises: a floor 2; side walls 3 at the right and left sides (only one side wall is shown in FIG. 1); a ceiling 4; an opening door 5 at the rear portion; and a refrigerating unit 6 at the front portion; thus forming a hexagonal box member. A storage chamber 1a for loading goods is provided in this box member. Heat insulating materials, not shown, are filled up in necessary portions of these component elements of the box member, thereby achieving heat insulation from the outside.

At the top portion of the refrigerating unit 6 at the front portion of the box member 1, there are provided an air feed port (gas feed port) 7, a blast fan 8, an evaporator 9 and a humidifier 10 with a control function, and, at the bottom portion of the refrigerating unit 6, there are an air intake port (gas intake port) 11 and a filter 11a for removing ethylene being generated from goods such for example as vegetables. Although not shown, a compressor is provided at the front portion of the box member.

On the floor 2 of the box member 1, there is laid a cooling rail 13 generally T-shaped in cross section for example, for placing goods 12 loaded in the storage chamber 1a, in a longitudinal direction (from right to left in FIG. 1).

Figure 2:
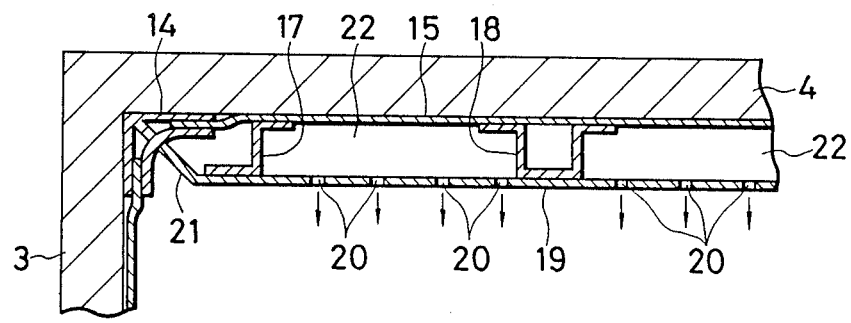
FIG. 2 is an enlarged sectional view taken along the line II—II in FIG. 1.

As shown in FIG. 2, at a joint portion between the side walls 3 and the ceiling 4 of the box member 1, a corner member 14 L-shaped in cross section is extended in the longitudinal direction, and at flange portions of this corner member 14, an end edge of a ceiling lining plate 15 and a side wall lining plate 16 are solidly fixed, respectively.

Furthermore, at opposite sides of the ceiling lining plate 15, spacer members 17 generally Z-shaped in cross section are fixed, and, at the central portion of the ceiling lining plate 15, a spacer member 18 generally hat-shaped in cross section is fastened. Then, at the under-surfaces of these spacer members 17, 18, an insulating plate (plate member) 19 formed with a plurality of air flow holes (gas flow holes) is stretchingly fixed. The side edge of this insulating plate 19 and the inner side of the L-shaped bent portion of the corner member 14 are connectingly fixed to one another through a spacer plate 21.

These ceiling lining plate 15, the insulating plate 19, the spacer plate 21 and the like constitute an air flow section (gas flow section) 22 for flowing air or gas between the ceiling lining plate 15 and the insulating plate 19.

Cooled air fed from the air feed port 7 by the blast fan 8 is humidified and adjusted by the humidifier 10, thereafter, flows into the air flow section 22, is passed through the air flow holes 20 in the insulating plate 19, and flows into the storage chamber 1a of the box member 1 from above to below. The air flow holes 20 of the insulating plate 29 are dispersed in plural numbers in a wide range over substantially the entire surface, so that feed of the cooled air into the box member 1 can be distributed equally and uniformly over the entire surface of the box member 1.

In the vicinity of an inlet of the air flow section 22, i.e. the air feed port 7, a damper device 23 is provided for preventing hot air from flowing into the storage chamber 1a of the box member 1 through the air flow section 22.

The provision of a heater 9a in the refrigerating unit 6 makes it possible that the heater operates periodically to defrost inside of the refrigerating unit 6 while the blast fan 8 is stopped. Then, when the blast fan 8 is stopped, air in the vicinity of the heater 9a would be heated and heat would move by the natural convection to increase the temperature in the box member 1, thus presenting a problem in conventional structure. The damper device 23 is provided for solving this problem.

Figure 3:
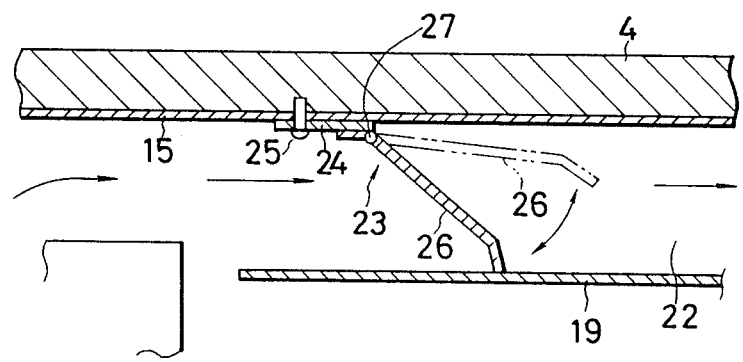
FIG. 3 is a sectional view, partially enlarged, showing a gas flow section and a damper device according to the invention.
Figure 4:
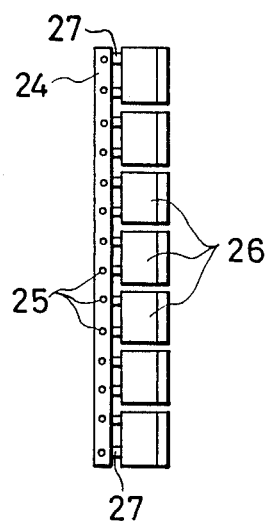
FIG. 4 is a plan view showing the damper device.

As shown in FIGS. 3 and 4, the damper device 23 is constructed such that a support plate 24 is fixed by rivets 25 in the widthwise direction of the ceiling lining plate 15 in the vicinity of the inlet of the air flow section 22, and a plurality of vanes 26 as being adjacent to one another are rotatably supported through hinges 27 in the widthwise direction of this support plate 24. The provision of this damper device 23 makes it possible for the vanes to rotate downwards to block the air flow section 22 when the blast fan 8 is stopped during defrosting. Therefore, the heated air does not flow into the air flow section 22 due to the natural convection. On the other hand, when the blast fan 8 rotates during cooling, the vanes rock upwards to allow the cooled air flow into the air flow section 22 as indicated by two dot chain lines in FIG. 3.

In this embodiment, the plurality of vanes 26 adjacent to one another are pivoted, whereby the vanes rock through a predetermined angle in accordance with the rotary speed of the blast fan 8 to open the air flow section 22 to the optimum value, so that the cooled air flowing into the air flow section 22 can be automatically adjusted to the optimum value.

Plurality of vanes 26 may be rotated independently of one another, or otherwise single vane 26 may be used.

Figure 5:
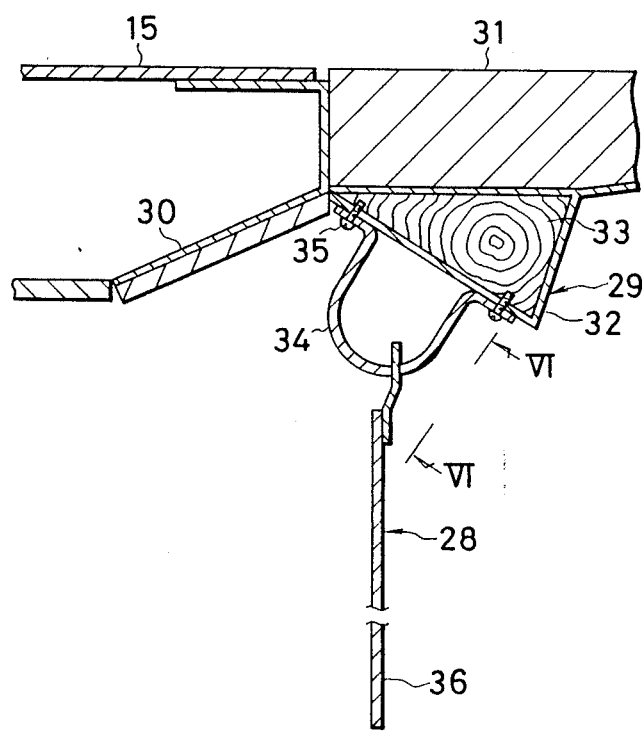
FIG. 5 is a sectional view, partially enlarged, showing an air shut-off means according to the invention.
Figure 6:
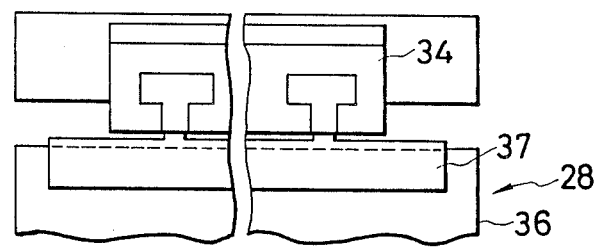
FIG. 6 is a view in the direction indicated by arrows from the line VI—VI in FIG. 5, showing the mounted portion thereabove.

Furthermore, as shown in FIGS. 1, 5 and 6, at the rear position of the box member 1 in this embodiment, there are provided an air shut-off mechanism (gas shut-off means) 28 for preventing hot air from flowing in during loading or unloading of the goods 12 into the storage chamber 1a, and a protecting mechanism (protecting means) 29 for preventing a direct impact force from being applied to this air shut-off mechanism 28 by, for example, a mast member of a fork lift, not shown, for loading or unloading of the goods.

Namely, a mount member 30 generally U-shaped in cross section is fixed to the undersurface of the ceiling lining plate 15 of the ceiling 4 at the rear portion of the box member 1, and a mount plate 31 is fixed to the rear portion, i.e. the right side in FIG. 5, of the mount member 30. Furthermore, at the underside of this mount plate 31, there are provided a protecting plate 32 formed into a triangular shape in cross section and a protecting material 33 made of wood formed in a triangular shape in cross section and surrounded by the protecting plate 32, so as to project outwardly from the air shut-off mechanism 28 as the protecting mechanism 29.

At one side obliquely downwardly directed from this protecting plate 32, a support member 34 generally U-shaped in cross section is fixed by screws 35. Then, an air shut-off curtain 36, as an example of the air shut-off mechanism 28, is suspended from the support member 34 by an engageable member 37. This air shut-off curtain 36 may be formed of a plastic sheet material such for example as vinyl resin.

Figure 7:
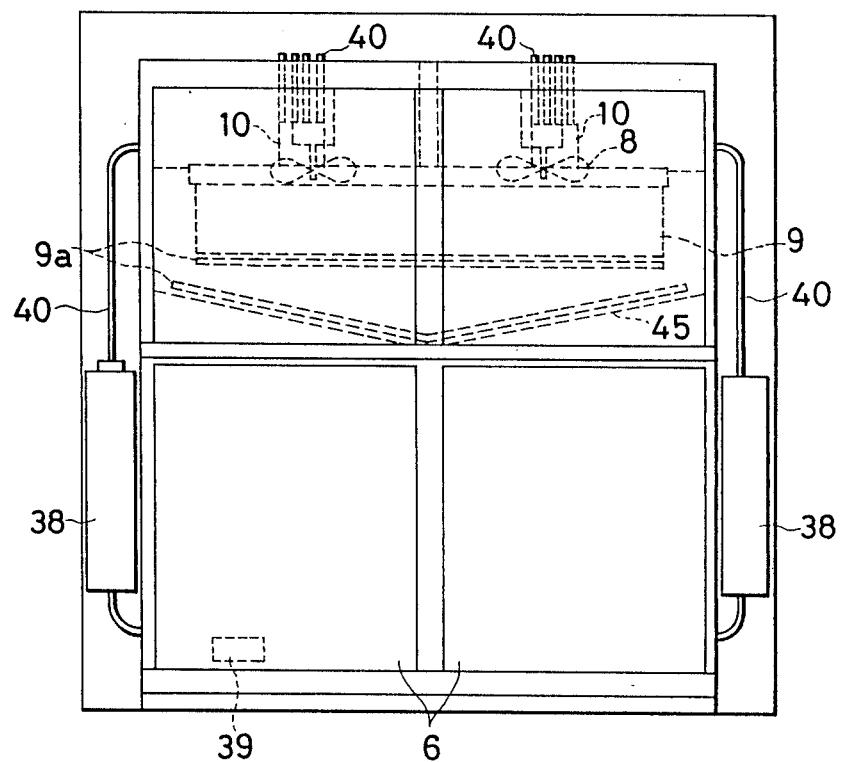
FIG. 7 is a side view showing the box member for refrigerated transportation according to the invention.
Figure 8:
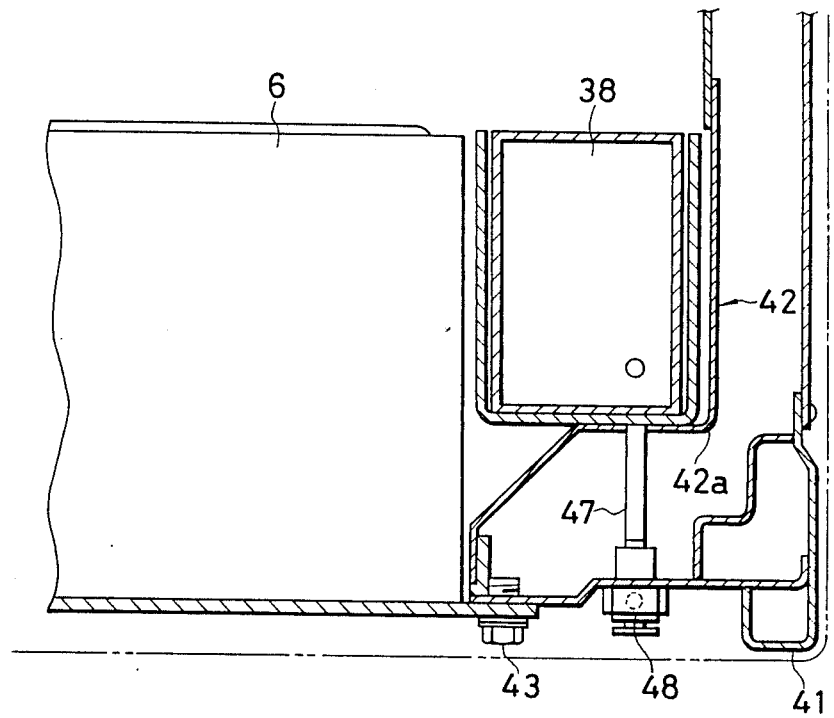
FIG. 8 is a sectional view, partially enlarged, showing a water tank mount portion.
Figure 9:
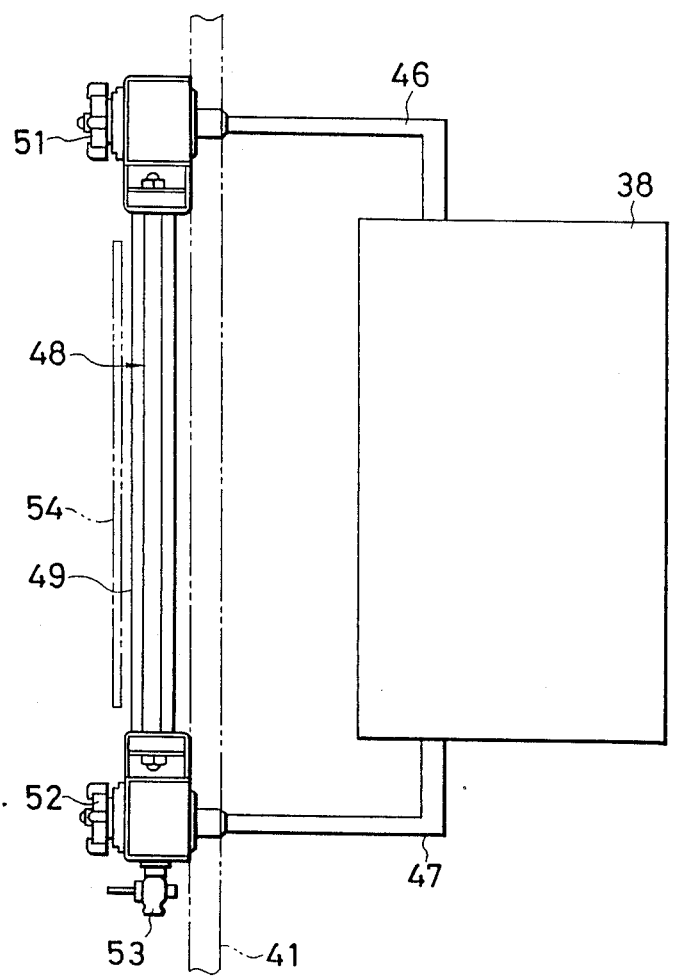
FIG. 9 is a side view showing a water tank mount construction of the box member for refrigerated transportation embodying the invention.

Further, as shown in FIGS. 7 and 8, the box member 1 in this embodiment is provided therein at both sides thereof with water tanks 38 for supplying a predetermined water to the humidifiers 10. Under operation of a water feed pump 39, these water tanks 38 supply the predetermined water to the humidifiers 10 through pipes 40.

In this embodiment, to mount the water tanks 38, special constructions are adopted in the vicinity of the front corner posts 41 at the both sides of the front portion of the box member 1. Namely, as shown in FIG. 8, the front corner posts 41 are provided at the both sides of the refrigerating unit 6 in the front portion of the box member 1. Further, in this embodiment, a tank mount member 42 is mounted to the inside of the front corner post 41 through a refrigerating unit mount bolt 43. This tank mount member 42 is bent in a generally L-shape to suitably mount the water tank 38 and the water tank 38 is arranged in contact with one side of a L-shaped bent formation 42a of the mount member 42.

By this water tank mount construction, the water tank 38 is stably mounted, and moreover, the water tank 38 can be reliably prevented from being broken by a direct external force.

Incidentally, in FIG. 7, reference numeral 44 is a spraying nozzle of the humidifier 10 and 45 is a drain pan for collecting a defrost drain during defrosting.

As shown in FIGS. 7, 8, 9 and 10, in the water tank mount construction of this embodiment, the water level in the water tank 38 can be visually confirmed from the outside of the box member 1 or the front corner post 41.

Namely, pipes 46, 47 from the top portion and the bottom portion of the water tank 38 are led through the front corner post 41 to the outside, respectively, and the outer ends of the pipes 46, 47 are connected to the level gauge 48 for visually confirming the water level of the water tank 38 from the outside.

Figure 10:
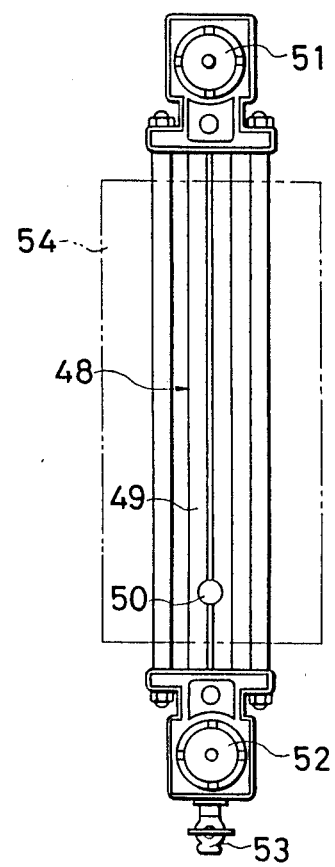
FIG. 10 is a front view thereof.

The level gauge 48 is constructed such that as float 50 (see. FIG. 10) is vertically moved in accordance with a water level in the water tank 38 in a tubular member 49 such for example as of transparent plastics, thus having resistance to climate, resistance to impact, chemical resistance and resistance to cold. Cocks 51 and 52 are provided at the top and the bottom ends of the tubular member 49, respectively.

Furthermore, at the bottom of the cock 52a, a discharge valve 53 for discharging water in the tank 38 is provided to prevent the level gauge 48 from freezing during use in the very cold weather for example.

Further, a protective net (protecting means) 54 is provided at the outside of the tubular member 49, so that the tubular member 49 can be prevented from being broken by any large external impact. Although not shown, one side of the outer frame of the protective net 54 is detachably secured to the outer surface of the front corner post 41 by screws or the like, and another side is openly supported by a hinge mechanism.

Figure 11:
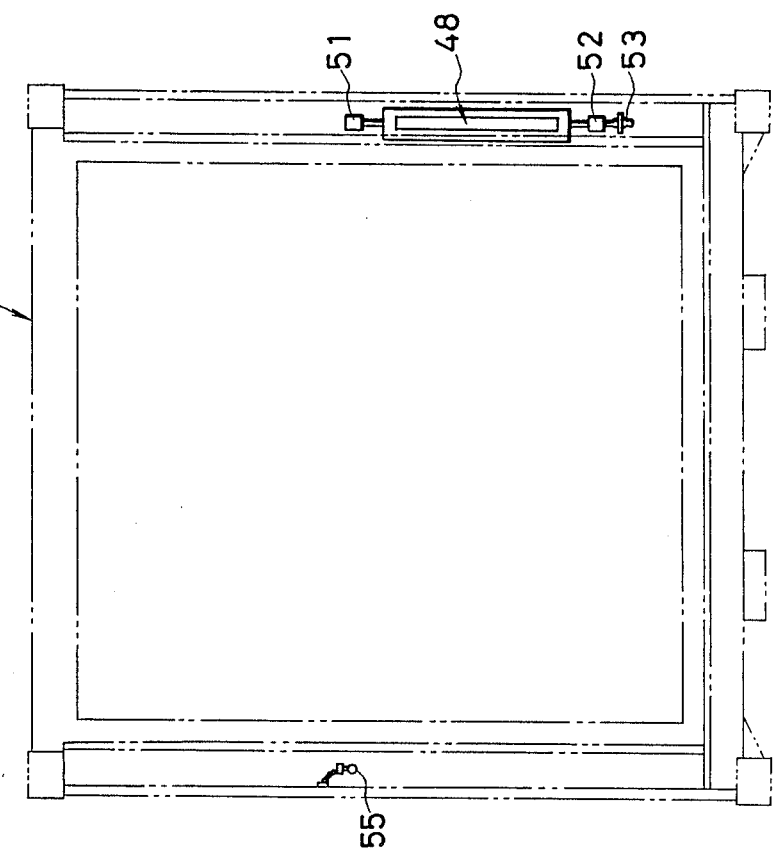
FIG. 11 is a side view of the box member for refrigerated transportation showing the outlines of a level gauge and a water feed port.

Furthermore, as shown in FIG. 11, in this embodiment, a water feed port 55 for supplying water to the water tank 38 is provided at the outside of the front corner post 41 on the opposite side to the level gauge 48. By this water feed port 55, water can be supplied to the water tank 38 very easily.

Action of this embodiment will hereunder be described.

First, a refrigerating cycle of this embodiment will be described. When the goods 12 are loaded into the storage chamber 1a inside the box member 1 and the refrigerating unit 6 is operated, the cooled gas such as the cooled air is passed through the evaporator 9, humidified and adjusted to a suitable humidity through the humidifier 10, passed through the damper device 23 in an open condition, and fed to the air flow section 22 formed between the ceiling 4 and the insulating plate 19 of the box member 1, by the action of the blast fan 8.

The cooled gas fed to the air flow section 22 is passed through the air flow holes 20 formed in plural numbers in the insulating plate 19, and flows into the storage chamber 1a in the box member 1 from above to below. At this time, since the air flow holes 20 of the insulating plate 19 are formed in plural numbers over the large area of the insulating plate 19, the cooled air passes through these air flow holes 20 and flows into the storage chamber 1a over the entire planar direction of the storage chamber 1a, and is uniformly distributed to the every corner of the storage chamber 1a.

Consequently, the temperature in the storage chamber 1a of the box member 1 is very uniformly held over the entire chamber 1a, so that storage of the goods can be performed at the optimum low temperature condition as a whole.

Thus, the cooled gas which has flowed into the every corner of the storage chamber 1a of the box member 1 flows from above to below while cooling the goods at the optimum low temperature condition, and flows from the rear portion to the front portion through the gaps in the axial direction between the cooling rails 13 on the floor 2 in the horizontal direction (to the left in FIG. 1). Then, the cooled gas is taken into the refrigerating unit 6 from the air intake port 11 under the refrigerating unit 6, and again is passed through the refrigerating unit 6, the air flow section 22 and the air flow holes 20 by the action of the blast fan 8, and recirculated to the storage chamber 1a.

In this embodiment, the cases where confirming of the water level and the water supply are performed will be described.

Namely, when the water level of the water tank 38 is confirmed, the cocks 51, 52 at the top and the bottom are opened and the position 50 of the level gauge 48 is visually confirmed, whereby the water level in the water tank 38 is confirmed. With this arrangement, the water level in the water tank 38 provided in the front corner post 41 can be easily visually confirmed from the outside of the box member 1.

By measuring the water level, when the water level would be lowered from a predetermined level, the water feed port 55 would be opened to supply a predetermined quantity of water.

Incidentally, in the case of using the box member 1 for example in a very cold area, the water residual in the level gauge 48 might be frozen to break the tubular member 49 and the like. To avoid such a problem, the cocks 51, 52 is closed after measuring the water level to open the discharge valve 53, so that the water in the level gauge 48 is discharged to the outside, thus reliably preventing the breakage of the gauge 48 by freezing.

This embodiment can offer the following excellent advantages.

(a) The air flow section 22 is formed between the plate member, i.e. the insulating plate 19 formed at the predetermined space between the ceiling in the top portion of the box member 1 and the underside thereof, and the air flow holes 20 are formed in plural members over the large area of the insulating plate 19, whereby the cooled gas passed through the air flow section 22 from the refrigerating unit 6 flows equally and uniformly from the air flow holes 20 into the storage chamber 1a to generate no dispersion in the temperature in the storage chamber 1a, so that the goods 12 can be cooled uniformly at the optimum low temperature condition at any portion of the storage chamber 1a.

(b) In this embodiment, as the cooled gas flows from above to below in the storage chamber 1a, dispersion in the temperature in the storage chamber 1a can be reduced as compared with the prior technique (refer to the Utility Model Unexamined Publication No. 63-63671 for example) in which the cooled gas flows in the opposite direction, i.e. from below to above in the storage chamber. One reason for the above lies in that the cooled gas moves downwards compared with the hot air due to the physical properties thereof, so that more smooth gas movement can be obtained when the cooled air is moved from above to below than it moves from below to the above.

The second reason lies in that, in general, the goods 12 are rarely loaded in the storage chamber 1a to the height in close contact with the plate member of the ceiling of the box, therefore the air flow holes 20 of the insulating member 19 are not blocked by the goods 12, and flow of the cooled gas flowing from above to below through the air flow holes 20 can be constantly secured. As contrast thereto, in the case where the cooled gas in the storage chamber would be flowed from below to above as in the prior technique shown in the above-described Utility Model Unexamined Publication No. 63-63671, a possibility of blocking the gas passage at the lower portion of the storage chamber by the goods is high, and, even if holes are provided to the rail at the bottom, the problem remains unsolved.

(c) As the insulating plate 19 is used as the plate member constituting the air flow section 22, when the cooled air passes through the air flow holes into the storage chamber 1a from above, so that water drops can not be generated in the air flow section, thus preventing the goods 12 from being damaged.

(d) As the damper device 23 is provided in the vicinity of the blast fan 8 in the air flow section 22 of this embodiment, even if the blast fan 8 is stopped during defrosting, the damper device 23 prevents the air heated by the heated device 9a from passing into the air flow section 22 and further to the storage chamber 1a by the natural convection.

(e) As the damper device 23 in this embodiment is constructed such that the plurality of vanes 26 as being adjacent to one another are rotatably supported, when the blast fan 8 stops during defrosting, the vanes 26 downwardly rotate to block the air flow section 22 in association with the fan stop, so that the heated air passed into the air flow section 22 and further to the storage chamber 1a can be reliably prevented.

(f) The air shut-off curtain 36 is provided as the air shut-off mechanism 28 in the rear-portion of the box member 1, therefore, the hot air (outside air) flowing into the storage chamber 1a or the cooled air in the storage chamber 1a flowing out to the outside during loading or unloading of the goods into or out of the storage chamber 1a can be prevented.

(g) The protective mechanism 29 constituted by the protecting plate 32 and the like is projected in the top of the air shut-off mechanism 28, even when the mast member of the fork lift, not shown, would collide on the air shut-off mechanism 28 during loading or deloading of the goods into the storage chamber 1a or therefrom for example, the mast member would be received by the direct collision of the protective mechanism 29, so that damage of the air shut-off mechanism 28 due to the direct collision would be reliably prevented.

(h) The water tanks 38 at the sides of the box member 1, i.e. on the both sides of the front portions in this embodiment are secured by the tank mount construction constituted by the tank mount members 42 having the L-shaped formations 42a suitable for mounting the water tanks 38, therefore, the water tanks 38 are stably mounted, and damages of the water tanks 38 due to the direct collision applied thereto can be reliably prevented.

(i) Though the water tank 38 is provided at the inside of the front corner post 41, i.e. in the box member 1, the level gauge 48 capable of confirming the water level of the water tank 38 is provided at the outside of the front corner post 41, i.e. at the outside of the box member 1, therefore the water level in the water tank 38 can be very easily visually confirmed from the outside.

(j) Since the tank mount member 42 suitably bent into the shape of the water tank 38 is provided at the inside of the front corner post 41, the water tank 38 can be stably and reliably mounted.

(k) The provision of mounting the water tank 38 at the inside of the front corner post 41 makes it possible to eliminate a possibility of the damage of the water tank 38 due to the external force applied thereto.

(l) The provision of the discharge valve 53 for discharging the water in the level gauge 48 at the bottom of the level gauge 48 makes it possible to prevent the damage of the level gauge 48 due to freezing thereof.

(m) The provision of the protective net at the outside of the level gauge makes it possible to prevent the damage of the level gauge 48 from the impact force applied thereto.

(n) The provision of the water feed port for feeding the water to the water tank 38 at the outside of the front corner post 41 makes it possible to feed the water to the water tank 38 very easily.

As has been described hereinabove, the invention has been described in detail on the basis of the present embodiment. However, the present invention should not be limited to the above embodiment, and, needless to say that various modifications are possible within the scope of the invention.

For example, the material of the insulating plate 19, the number and dispositions of the air flow holes 20 may be changed variously.

Furthermore, as the construction of the damper device 23, the construction other than the plurality of the vanes 26 may be used.

Further, the air shut-off curtain 36 as the air shut-off mechanism 28 may use a sheet of other than a plastic material.

Furthermore, only if the direct collision of the external means to the air shut-off mechanism 28 can be avoided, a protecting means 29 other than the above embodiment may be used variously.

Further, as the cooled gas, such as N2 gas may be used, and this case may be included in this invention.

Furthermore, the level gauges 48 and the construction of water feed ports 55, the mounted positions and the numbers thereof should not limited to the above embodiment.

Instead of the protecting net 54, the protecting means having the construction other than that may be used.

In the above description, the case where the box member for refrigerated transportation is used in marine transportation is explained as one of application field of the present invention. However, this invention should not be limited to this, and the invention can be applied to a box member for refrigerated transportation such as a land transportation by a large-sized truck for example.

Needless to say, the present invention includes a case where the box member is used in an installed position without performing the transportation.

Of the inventions disclosed, the typical advantages achieved are described in briefly as follows.

(a) The refrigeration unit having the gas feed port at the front portion at the inside of the box member and having the gas intake port at the bottom thereof are provided, the plate member formed with the gas flow holes at the predetermined space from the undersurface of the ceiling is stretched so as to form the gas flow section, and the gas fed from the refrigerating unit flows from above to below of the box member through the gas flow section and the gas flow holes. With this arrangement, the cooled gas passes through the gas flow section formed at the underside of the ceiling and flows into the box member from above to below through the gas flow holes formed in the plate member, so that the cooled air can flow into the box member smoothly with the gas flow holes being not blocked by the goods in the box member.

In this case, the gas flow holes of the plate member distribute over the large area of the plate member, whereby the cooled gas is equally distributed to the every corner of the box member, whereby the temperature in the box member is distributed uniformly as a whole, so that the perishables and the like can be preserved and/or transported at the optimum low temperature at every position within the box member.

(b) The plate member is formed of the insulating member, so that the goods in the box member can be prevented from being damaged by the water drops generated when the cooled gas passes through the gas flow holes of the plate member.

(c) Since the damper device for preventing the heated gas from flowing into the gas flow section and the storage chamber during defrosting is provided in the vicinity of the gas feed port, even if the blast fan is stopped during defrosting, the gas heated by the heater can be reliably prevented from flowing into the gas flow section and the storage chamber of the box member by the natural convection.

(d) The damper device has the plurality of vanes rotatably pivoted as being adjacent to one another along the widthwise direction of the gas flow section, the plurality of vanes are rotated upwardly to open the gas flow section during the operation of the blast fan provided in the front and at the inside of the box member and rotated downwardly during the stop of the blast fan to block the gas flow section, so that the heated gas can be further reliably prevented from flowing into the gas flow section and the box member by the natural convection during defrosting.

(e) In the box member for refrigerated transportation according to the present invention, the air shut-off means is suspended from the rear portion at the predetermined space from the inner side surface of the box member whereby the atmospheric gas can be prevented from flowing into and from the box member during loading, unloading or the like of the goods into the box member and the cooled gas can be prevented from flowing to the outside the box member, thus reliably keeping the temperature in the box member at the optimum low temperature condition.

(f) The protecting means projected outwardly of the top portion of the air shut-off means in the vicinity of the air shut off means, for preventing the impact force by the external means is provided, so that the external means such as the mast member of the fork lift, for example, is prevented from directly colliding on the air shut-off means during loading or unloading of the goods into or from the box member for example, thus effectively avoiding the damage of the air shut-off means.

(g) The water tank is provided in the box member for refrigerated transportation, and the level gauge for confirming the water level of the water tank and the water tank are provided at the outside of the box member for refrigerated transportation, so that the water level of the water tank provided in the box member can be very easily confirmed from the outside, thus the feed of water to the water tank being performed very easily.

(h) With the arrangement of the (g) above, the water tank can be prevented from the damage due to the impact by the external force.

(i) The water tank is provided at the inside of the front corner post and the level gauge and the water feed port are provided at the outside of the front corner post, so that the water tank can be protected from the external force and the water tank can be reliably mounted by effectively utilizing the space of the box member.

(j) The tank mount member suitably bent to the shape of the water tank at the inside of the front corner post is provided so that the water tank can be stably and reliably mounted.

(k) The discharge valve for discharging the water in the level gauge is provided at the bottom of the level gauge, so that the level gauge can be reliably prevented from being broken due to the freezing of water residual in the level gauge, even during the use in a very cold weather for example.

(l) The protecting means for protecting the level gauge from the external impact is provided at the outside of the level gauge, so that the level gauge can be reliably protected from being broken by the external impact.

What is claimed is:

1. A gaseous flow construction of a box member for refrigerated transportation, wherein the box member has a forward portion, a bottom portion and a ceiling, comprising, a refrigerating unit having a gas feed port in the forward portion in the box member and a gas intake port at the bottom thereof, a plate member formed with a plurality of gas flow holes and spaced a predetermined amount from the undersurface of the ceiling of the box member, said plate member being extended to form a gas flow section, and a gas fed from the gas flow section flows from above to below the box member through the gas flow section and the gas flow holes, and wherein said plate member is an insulating plate, and wherein said box member includes a storage chamber and a damper device is provided in the vicinity of the gas feed port for preventing a heated gas from flowing into the gas flow section and the storage chamber of the box member during defrosting.

2. A gaseous flow construction as set forth in claim 1 wherein a blast fan is provided in the forward portion and at the inside of the box member, said damper device has a plurality of vanes adjacent to each other in the widthwise direction of said gas flow section, said vanes being rotatably pivotably supported and are rotatable upwardly to open the gas flow section during the operation of the blast fan and rotate downwardly to block the gas flow section when the blast fan is not operating.

3. A gaseous flow construction of a box member for refrigerated transportation, wherein the box member has a forward portion, a bottom portion and a ceiling, comprising, a refrigerating unit having a gas feed port in the forward portion in the box member and a gas intake port at the bottom thereof, a plate member formed with a plurality of gas flow holes and spaced a predetermined amount from the undersurface of the ceiling of the box member, said plate member being extended to form a gas flow section, and a gas fed from the gas flow section flows from above to below the box member through the gas flow section and the gas flow holes, and wherein said box member has a rear portion provided with a door having an inner side surface and is further provided with an air shutoff means suspended from a rear portion of the ceiling at a position spaced a predetermined amount from an inner side surface of the door.

4. A gaseous flow construction as set forth in claim 3 and wherein said box member includes an air shutoff means having a top portion, a projecting means projected outwardly from the top portion of the air shutoff means in the vicinity of the top portion of the air shutoff means for preventing an impact force of an external means from being applied directly to the air shutoff means.

5. A gaseous flow construction of a box member for refrigerated transportation, wherein the box member has a forward portion, a bottom portion and a ceiling, comprising, a refrigerating unit having a gas feed port in the forward portion in the box member and a gas intake port at the bottom thereof, a plate member formed with a plurality of gas flow holes and spaced a predetermined amount from the undersurface of the ceiling of the box member, said plate member being extended to form a gas flow section, and a gas fed from the gas flow section flows from above to below the box member through the gas flow section and the gas flow holes, and wherein said box member includes a water tank provided at the inside of the box member, and a level gauge for confirming the water level of the water tank, and a water feed port to the water tank is provided at the outside of the box member.

6. A gaseous flow construction of a box member for refrigerated transportation as claimed in claim 5 and wherein said box member includes a front corner post and the water tank is provided at the inside of the front corner post, and said level gauge and said water feed port are provided at the outside of the front corner post.

7. A gaseous flow construction of a box member for refrigerated transportation as claimed in claim 6 and wherein a tank mount member is bent to the shape of the water tank and is provided at the inside of the front corner post.

8. A gaseous flow construction of a box member for refrigerated transportation as claimed in claim 5 and wherein said box member includes a discharge valve provided at the bottom portion of the level gauge for discharging water in the level gauge.

9. A gaseous flow construction of a box member for refrigerated transportation as claimed in claim 5 and wherein said box member includes protecting means provided at the outside of the level gauge for protecting the level gauge from an external impact.

* * * * *

UNITED STATES PATENT AND TRADEMARK OFFICE
CERTIFICATE OF CORRECTION

PATENT NO. : 4,979,431

DATED : December 25, 1990

INVENTOR(S) : Shizuo Fujimoto et al.

It is certified that error appears in the above-identified patent and that said Letters Patent is hereby corrected as shown below:

On the title page, in the Title, change "TRANSPORTION" to -- TRANSPORTATION --.

At column 1, line 3, change "TRANSPORTION" to -- Transportation --.

At column 9, line 49, after "ceiling" insert -- 4 --.

Signed and Sealed this

Ninth Day of June, 1992

Attest:

DOUGLAS B. COMER

*Attesting Officer*     Acting Commissioner of Patents and Trademarks